United States Patent
Chominski et al.

(10) Patent No.: US 6,915,117 B2
(45) Date of Patent: Jul. 5, 2005

(54) MULTISTAGE MODULATION ARCHITECTURE AND METHOD IN A RADIO

(75) Inventors: Paul P. Chominski, San Diego, CA (US); Jonathan L. Kennedy, Auburn, CA (US); Lawrence E. Larson, Del Mar, CA (US); Joshua C. Park, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 09/850,629

(22) Filed: May 3, 2001

(65) Prior Publication Data

US 2002/0164965 A1 Nov. 7, 2002

(51) Int. Cl.⁷ .................................. H04B 1/26
(52) U.S. Cl. .................. 455/118; 455/112; 455/113; 455/260; 455/20
(58) Field of Search ................... 455/112, 113, 455/118, 188.1, 183.1, 260, 76, 20, 265, 180.1, 180.2; 375/307, 308

(56) References Cited

U.S. PATENT DOCUMENTS

| | | | |
|---|---|---|---|
| 4,081,752 A | | 3/1978 | Sumi |
| 4,862,515 A | | 8/1989 | Cowley |
| 6,085,075 A | * | 7/2000 | Van Bezooijen ............ 455/260 |
| 6,282,413 B1 | * | 8/2001 | Baltus ........................ 455/260 |
| 6,356,597 B1 | * | 3/2002 | Jackson et al. .............. 375/308 |
| 2001/0008384 A1 | * | 7/2001 | Ku ................................ 331/2 |

* cited by examiner

Primary Examiner—Nick Corsaro
Assistant Examiner—Alan T. Gantt
(74) Attorney, Agent, or Firm—Blakely, Sokoloff, Taylor & Zafman LLP

(57) ABSTRACT

In a multiple stage transmitter, and analog signal is modulated and mixed to produce a radio frequency output. A separate mixing frequency signal is provided to each stage. A single frequency synthesizer is used rather than a plurality of frequency synthesizers. In a two-stage system, first and second dividers each receive the output of the frequency synthesizer and deliver a mixing signal to the first and second stages respectively. The modulus of each divider may be selected to minimize spurious signals.

18 Claims, 1 Drawing Sheet

MULTISTAGE MODULATION ARCHITECTURE AND METHOD IN A RADIO

BACKGROUND OF THE INVENTION

1. Field of Invention

The present invention relates to modulation in radio frequency transmitters and more particularly to efficient provision of mixing frequency signals.

2. Background in the Art

While the present invention has a wide range of utility, it finds particular application in wireless applications, particularly those embodied in silicon chips. A particularly important application for solid state transmitters is in mobile telephones. It is desirable to provide architecture for generating second generation or third generation mobile telephone operation. Second generation standards include CDMA (Code Division Multiple Access), TDMA (Time Division Multiple Access, IS-136), and GSM standard (Global Systems for Mobile). Third generation standards include WCDMA (Wide-band Code Division Multiple Access) and CDMA 2000.

A radio frequency transmitter must translate an analog input into a radio frequency signal and also provide for variable gain to provide for a selected input level to a power amplifier prior to transmission. In the modulation process, an analog signal is mixed with a mixing frequency signal to provide a higher frequency output signal. The mixing signal is commonly provided from a frequency synthesizer including a voltage controlled oscillator (VCO). Wireless transmitters in today's marketplace must be implemented cost-effectively in order to be competitive.

Current ways of addressing this need have particular drawbacks. In the well-known simple direct modulation transmitter, translation of the analog signal to a radio frequency signal is done in one stage, with one mixing step. CDMA and WCDMA systems require a dynamic range of 90 dB. Almost the whole range must be performed in amplifiers or attenuators working at the same frequency, nominally between 1 and 2 GHz. Consequently, the range of variable gain required of the transmitter must be accomplished in this frequency domain, which is quite difficult.

In the direct modulation transmitter, isolation between the power amplifier and VCO is minimized, and "cross-talk" between them may result, causing signal distortion. Additionally, carrier feedthrough may result in VCO signal leakage into the radio frequency band, also distorting the transmitted signal. Since the transmission frequency provided by the VCO is working on the same or on a harmonic of the transmitter output frequency, frequency pulling or inject locking of the VCO may result. There is also a risk for oscillation due to the high gain in direct modulation on the same frequency and feedback within an integrated circuit (IC) in which the direct modulator is embodied and outside the IC including a power amplifier between the modulator and a transmitting antenna and other coupling components.

The well-known double conversion transmitter addresses these problems found in the direct modulation transmitter. The initial modulation and mixing described above is done in a first stage providing an intermediate frequency output. A portion of the variable gain range is then implemented at the intermediate frequency. The intermediate frequency signal is the mixed with a second mixing frequency signal from a second frequency synthesizer and second VCO. Also, an extra intermediate frequency filter is required in the transmitter circuit to avoid production of spurious signals. The added circuits elements add significant expense to a transmitter embodied in a silicon chip. The degree of added expense could be sufficient to render such a transmitter uncompetitive in the marketplace.

SUMMARY OF THE INVENTION

It is therefore a general object of the present invention to provide a radio frequency transmitter having an efficient and reliable modulation scheme particularly suited for $2^{nd}$ and $3^{rd}$ generation wireless mobile transceiver operation.

It is a more specific object of the present invention to provide a transmitter for modulating and amplifying analog signals wherein a single signal frequency source is used as a source for mixing frequencies for a plurality of mixing stages.

It is a more particular object of the present invention to provide a transmitter of the type described in which a plurality of frequencies is produced from said frequency source.

It is a further object of the present invention to provide a transmitter of the type described in which dividers are provided to produce each of the plurality of frequencies.

It is also an object of the present invention to provide a transmitter of the type described in which a modulus of each divider is selected for minimizing production of spurious signals.

It is an additional object of the present invention to provide a method for supplying each mixing frequency in a transmitter of the type described.

Briefly stated, in accordance with the present invention there are provided a method and apparatus for transmitter transmitting a radio frequency signal in response to an analog signal input and having a plurality of frequency conversion stages. In the embodiment comprising two stages, a modulator includes a first mixer providing an intermediate frequency output and a second mixer providing a radio frequency output, said mixers being supplied with first and second mixing signals respectively. The mixing signals are provided from first and second frequency dividers each receiving an input from the same frequency synthesizer. Each of said first and second frequency dividers has a respective, selected modulus which in a preferred form may be selected for minimization of spurious signals.

BRIEF DESCRIPTION OF THE DRAWINGS

The means and method by which the foregoing objects and features of invention are achieved are pointed out in the claims forming the concluding portion of the specification. The invention, both as to its manner of organization and its operation, may be further understood by reference to the following description taken in connection with the following drawings:

DESCRIPTION OF THE PREFERRED EMBODIMENTS

Figure 1:
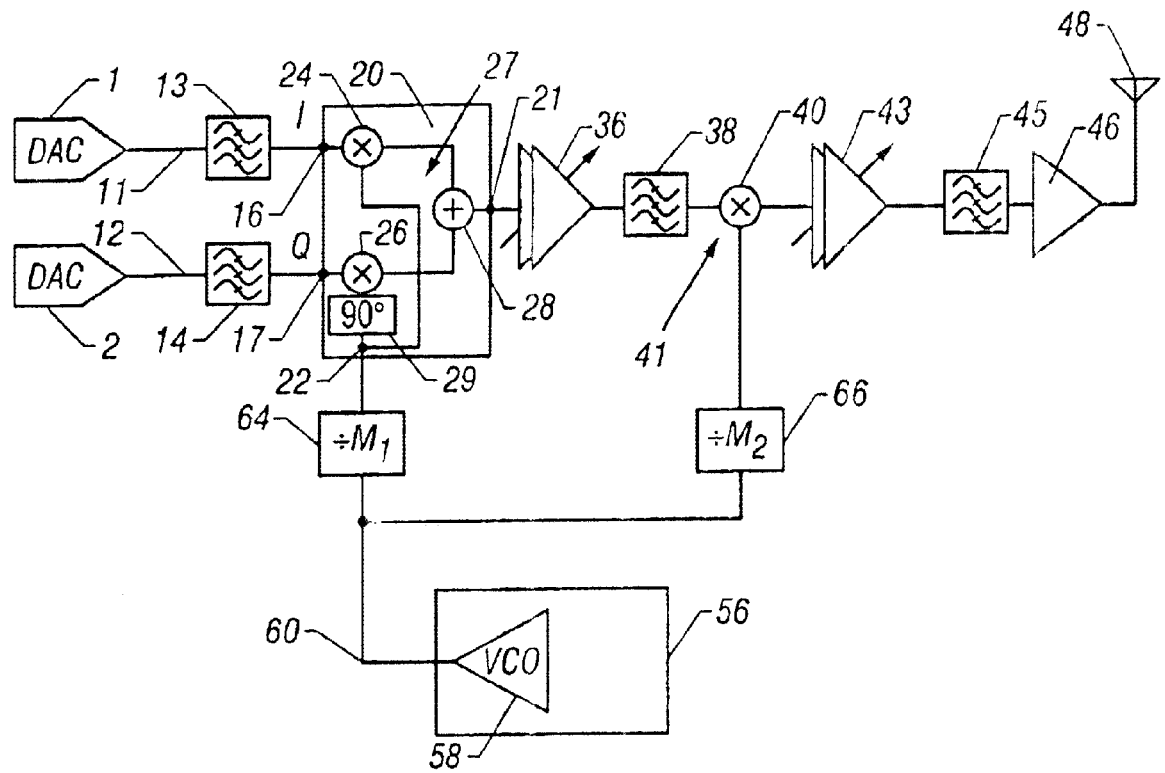
FIG. 1 is a block diagrammatic illustration of the present invention.

Referring now to FIG. 1, a transmitter 10 constructed in accordance with the present invention is illustrated in block diagrammatic form. The transmitter 10 receives inputs from analog sources 1 and 2, illustrated here as digital to analog converters, at input ports 11 and 12 respectively. The input ports 11 and 12 feed in-phase and quadrature channels I and Q respectively. The use of the out of phase channels I and Q is a common technique in digital modulation.

In the I channel, the input port 11 provides the analog signal to an input filter 13 coupled to an input terminal 16 of a modulator 20. Similarly in the Q channel, the input port 12 provides the analog signal to an input filter 14 coupled to an input terminal 17 of the modulator 20. The modulator 20 has an output terminal 21. A first mixing frequency $f_{m1}$, further described below, is connected to a terminal 22 of the modulator 20. First and second mixers 24 and 26 in the I and Q channels respectively provide signal outputs to a signal adder 28 providing a signal to the output terminal 21 of the modulator 20. The first mixing signal input is provided to the mixer 26 from the mixing signal terminal 22. The terminal 22 is also coupled via a quadrature phase shifter 29 to a second input of the mixer 26. Alternatively, the quadrature phase shifter 29 can be coupled to the mixer 24. FIG. 1 is also illustrative of an embodiment where any kind of digital modulation is performed. The analog signals from the sources 1 and 2 are modulated in a well-known manner. The mixers 24 and 26 are comprised in a first stage 27. Due to the quadrature phase shifter 29, an out of phase components is supplied to the signal adder 28, whereby the signals from the sources 1 and 2 are quadrature modulated and added and provided to the output terminal 21 of the modulator 20. This output is an intermediate frequency signal at frequency $f_1$.

The output terminal 21 provides the intermediate frequency signal to a variable gain amplifier 36, which provides a part of the total dynamic range of the transmitter 10. The variable gain amplifier 36 provides the intermediate frequency signal to an intermediate frequency filter 38, which provides the intermediate frequency signal to a mixer 40. The mixer is comprised in a second stage 41. As further described below, the mixer 40 also receives an input which is a second mixing frequency signal, $f_{m2}$. The mixer 40 provides a radio frequency output at frequency $f_{RF}$. This radio frequency output is coupled to a variable gain amplifier 43 coupled to a radio frequency filter 45. The output of the radio frequency filter 45 is amplified by a power amplifier 46 and coupled for transmission by an antenna 48.

In accordance with the present invention, a single source from which both the first and second mixing frequency signals are produced is a frequency synthesizer 56 including a voltage controlled oscillator (VCO) 58 providing a signal at a frequency $f_{VCO}$ at a terminal 60. First and second frequency dividers 64 and 66 are provided, each having an input connected to the terminal 60. The frequency divider has a first modulus, $M_1$, and provides an output at the frequency $f_{m1}$ to the terminal 22 of the modulator 20. The frequency divider 66 has a second modulus, $M_2$, and provides an output at a frequency $f_{m2}$ to the mixer 40. Consequently, frequency conversion at a plurality of stages, e.g. two stages, is accomplished with a single frequency synthesizer 56.

Since neither $f_{m1}$ nor $f_{m2}$ are in the transmission frequency $f_{RF}$, as in a direct modulator, this circuit architecture does not suffer from carrier feedthrough. In this structure, modulation frequencies and the transmitter output frequency are related as in equation 1.

$$f_{RF}=[(M1+M2)/(M1*M2)]*f_{VCO} \qquad (1)$$

The RF transmission frequency is not a direct multiple of $f_{VCO}$. Consequently, interaction between the frequency synthesizer 56 and the power amplifier 46 is reduced. Based on equation (1), spurious signals, e.g., harmonics that can be produced by the two mixing stages 27 and 41, are multiples of the fundamental frequency of $f_{VCO}/(M1*M2)$. This set of frequencies is easier to analyze than that produced by the conventional double conversion modulator whose corresponding spurious signal expression is $M*f_{m1} \pm Nf_{m2}$, where M and N are integers. This expression creates a solution set of spurious signals which is more difficult to work with due to its containing terms rather than factors only.

It is preferred to break down the frequency chain by which the modulated signal is translated to a radio frequency into not-harmonically related subfrequencies. The frequencies $f_{VCO}$, $f_{m1}$ and $f_{m2}$ should be selected so that it has no harmonic or subharmonic relation to $f_{RF}$. This is accomplished first by selection of $f_{VCO}$, and next by selecting moduli M1 and M2 to have different values. For example, M1 and M2 may be in the ratio of 4:3 or 8:7. M1 may conveniently be a number divided by 4 to provide for simple generation of a quadrature $f_{m1}$ for the modulator 20. In order to meet the above constraint relating to harmonics, M2 may be conveniently selected as M1±N, where N is a positive integer. However, M1 and M2 can be any combination of two different positive integers.

Figure 2:
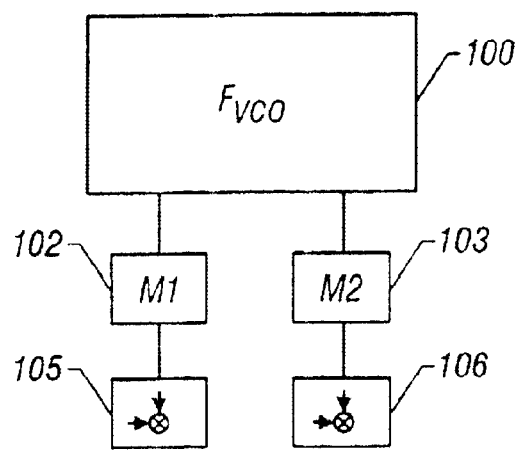
FIG. 2 is a flow diagram of the method of the present invention.

FIG. 2 is a flow chart illustrating the method of the present invention. The components referred to in connection with the method steps are illustrated in FIG. 1. At block 100, the local oscillator frequency $f_{VCO}$ is provided by a single source, here the frequency synthesizer 56. The frequency $f_{VCO}$ is divided by the modulus M1 of the frequency divider 62, as illustrated at block 102. At the same time, the local oscillator frequency $f_{VCO}$ is also divided by frequency divider 66 with modulus M2, as seen at block 103. As seen at block 105, the mixing step is performed in the modulator 20. As seen at block 106, the mixing step is performed in the mixer 40. The moduli used in the frequency dividers 64 and 66 are preset when the frequency dividers are manufactured.

An efficiently constructed transmitter and a method are provided with the capability of minimizing spurious signal production. The above description will enable those skilled in the art to make many different forms of transmitters constructed in accordance with the present invention.

What is claimed is:

1. In a double conversion transmitter transmitting a radio frequency signal in response to an analog signal input and comprising a modulator having both in-phase and quadrature channels including a first mixer in each channel and providing an intermediate frequency output and a second mixer providing a radio frequency output, said mixers being supplied with first and second mixing signals respectively and mixing signal means for providing said first and second mixing signals, the improvement wherein said mixing signal means comprises:

a first frequency divider and a second frequency divider having outputs connected to the mixers in each channel of said first mixer and said second mixer respectively, each of said first and second frequency dividers having a respective, selected and different modulus for dividing an input to the frequency divider by the respective modulus; and a frequency synthesizer providing a signal at a local oscillator frequency to the inputs of said first and second frequency dividers;

the modulus of the first and second frequency dividers are related by the expression:

$$f_{RF}=[(M1+M2)/(M1*M2)]*f_{VCO}$$

where $f_{RF}$ is the frequency of the radio frequency signal, M1 and M2 are the first and second moduli respectively and $f_{VCO}$ is the output frequency of the frequency synthesizer.

2. The transmitter according to claim 1 wherein M1 is a multiple of 4.

3. The transmitter according to claim 2 where M2=M1±N where N is a positive integer.

4. A double conversion transmitter transmitting a radio frequency signal in response to an analog signal input and comprising a modulator having both inphase and quadrature channels including a first mixer having a mixer in each channel and providing an intermediate frequency output and a second mixer providing a radio frequency output, said mixers being supplied with first and second mixing signals respectively, a frequency synthesizer providing a signal at a local oscillator frequency, first and second frequency dividers each constructed with a different modulus and each receiving an input from said frequency synthesizer at the local oscillator frequency and coupled for providing said first and second mixing signals to the mixer in each channel of said first mixer and said second mixer respectively, each at a frequency equal to the local oscillator frequency divided by a respective modulus, the modulus of the first and second frequency dividers being related by the expression:

$$f_{RF}=[(M1+M2)/(M1*M2)]*f_{VCO}$$

where $f_{RF}$ is the frequency of the radio frequency signal, M1 and M2 are the first and second moduli respectively and $f_{VCO}$ is the frequency of the frequency synthesizer.

5. The transmitter according to claim 4 wherein M1 is a multiple of 4.

6. The transmitter according to claim 5 where M2=M1±N where N is a positive integer.

7. In a method for translation an analog signal to a radio frequency signal comprising modulating inphase and qaudrature components of an analog signal and mixing each said component of the analog signal with a first mixing frequency signal to provide a first intermediate frequency signal and mixing said first intermediate frequency signal with a second mixing frequency signal to provide a radio frequency output, the improvement comprising:

providing one frequency synthesizer as a source for said first and second mixing frequency signals; and dividing the output of said frequency synthesizer by first and second moduli to produce said first and second mixing frequencies, the moduli in the division being related by the expression:

$$f_{RF}=[(M1+M2)/(M1*M2)]*f_{VCO}$$

where $f_{RF}$ is the frequency of the radio frequency signal, M1 and M2 are the first and second moduli respectively and $f_{VCO}$ is the frequency of the frequency synthesizer.

8. The method of claim 7 wherein the step of dividing comprises utilizing an M1 which is a multiple of 4.

9. The method of claim 8 wherein the step of dividing comprises utilizing moduli where M2=M1±N where N is an integer.

10. In a double conversion transmitter transmitting a radio frequency signal in response to an analog signal input and comprising a modulator including a first mixer providing an intermediate frequency output and a second mixer providing a radio frequency output, said mixers being supplied with first and second mixing signals respectively and mixing signal means for providing said first and second mixing signals, the improvement wherein said mixing signal means comprises:

a first frequency divider and a second frequency divider connected to said first mixer and said second mixer respectively, each of said first and second frequency dividers having a respective, selected modulus; and a frequency synthesizer providing a signal at a local oscillator frequency to said first and second frequency dividers, wherein said modulator comprises both in-phase and quadrature channels and said first mixer comprises a mixer in each said channel and wherein said first frequency divider provides an input to said mixer to each said channel, said first and second frequency dividers are each constructed with a different modulus, and the modulus of the first and second frequency dividers are related by the expression:

$$f_{RF}=[(M1+M2)/(M1*M2)]*f_{VCO}$$

where $f_{RF}$ is the frequency of the radio frequency signal, M1 and M2 are the first and second moduli respectively and $f_{VCO}$ is the output frequency of the frequency synthesizer.

11. The transmitter according to claim 10 wherein M1 is a multiple of 4.

12. The transmitter according to claim 11 where M2=M1±N, where N is a positive integer.

13. A double conversion transmitter transmitting a radio frequency signal in response to an analog signal input and comprising a modulator including a first mixer providing an intermediate frequency output and a second mixer providing a radio frequency output, said mixers being supplied with first and second mixing signals respectively, a frequency synthesizer providing a signal at a local oscillator frequency, first and second frequency dividers each receiving an input from said frequency synthesizer and coupled for providing said first and second mixing signals to said first mixer and said second mixer respectively, wherein said modulator comprises both in-phase and quadrature channels and said first mixer comprises a mixer in each said channel and wherein said first frequency divider provides an input to said mixer to each said channel, said first and second frequency dividers are each constructed with a different modulus, and the modulus of the first and second frequency dividers are related by the expression:

$$f_{RF}=[(M1+M2)/(M1*M2)]*f_{VCO}$$

where $f_{RF}$ is the frequency of the radio frequency signal, M1 and M2 are the first and second moduli respectively and $f_{VCO}$ is the output frequency of the frequency synthesizer.

14. The transmitter according to claim 13 wherein M1 is a multiple of 4.

15. The transmitter according to claim 14 where M2=M1±N, where N is a positive integer.

16. In a method for translation an analog signal to a radio frequency signal comprising the steps of modulating an analog signal and mixing the analog signal with a first mixing frequency signal to provide a first intermediate frequency signal and mixing said first intermediate frequency signal with a second mixing frequency signal to provide a radio frequency output, the improvement comprising: providing a one frequency synthesizer as a source for said first and second mixing frequency signals; and dividing the output of said frequency synthesizer by first and second divisors to produce said first and second mixing frequencies, wherein said modulator comprises both in-phase and quadrature channels and said first mixer comprises a mixer in each said channel and wherein said first frequency divider provides an input to said mixer to each said channel, the step of dividing comprises utilizing first and second moduli to produce said first and second mixing frequencies, and the modulus of the first and second frequency dividers are related by the expression:

$$f_{RF}=[(M1+M2)/(M1*M2)]*f_{VCO}$$

where $f_{RF}$ is the frequency of the radio frequency signal, M1 and M2 are the first and second moduli respectively and $f_{VCO}$ is the output frequency of the frequency synthesizer.

17. The transmitter according to claim 16 wherein M1 is a multiple of 4.

18. The transmitter according to claim 17 where M2=M1±N, where N is a positive integer.

* * * * *